United States Patent [19]

Kelly

[11] Patent Number: 5,356,559
[45] Date of Patent: Oct. 18, 1994

[54] OPTICALLY ACTIVE PIPERAZINYL DERIVATIVES AS LIQUID CRYSTALS

[75] Inventor: Stephen Kelly, Möhlin, Switzerland
[73] Assignee: Hoffmann-La Roche Inc., Nutley, N.J.
[21] Appl. No.: 909,930
[22] Filed: Jul. 7, 1992

[30] Foreign Application Priority Data

Jul. 19, 1991 [CH] Switzerland ............ 2164/91

[51] Int. Cl.$^5$ ............ C09K 19/34; C09K 19/54; C07D 239/02; C07D 211/90
[52] U.S. Cl. ............ 252/299.61; 252/299.5; 546/287; 546/193; 544/298; 544/358; 544/295
[58] Field of Search ............ 546/287, 193; 252/299.61, 299.5; 544/358, 295

[56] References Cited

U.S. PATENT DOCUMENTS

| | | |
|---|---|---|
| 4,264,148 | 4/1981 | Gobl-Wunsch et al. ........ 359/103 X |
| 4,961,876 | 10/1990 | Demus et al. ................ 252/299.67 |

FOREIGN PATENT DOCUMENTS

| | | |
|---|---|---|
| 790060 | 7/1968 | Canada . |
| 0286043 | 10/1988 | European Pat. Off. . |
| 0024563 | 2/1983 | Japan . |

OTHER PUBLICATIONS

Demus, Flussige Kristalle in Tabellen I, pp. 253–254.
Demus, Flussige Kristalle in Tabellen I, pp. 346–348.
J. de Physique, Colloque C1, supplement au n°3, Tome 36, Mars 1975, p. C1-379.
Mol. Cryst. Liq. Cryst., vol. 185, p. 131 (1990).

Primary Examiner—Robert L. Stoll
Assistant Examiner—C. Harris
Attorney, Agent, or Firm—George M. Gould; William H. Epstein; Patricia S. Rocha

[57] ABSTRACT

Optically active compounds of the formula

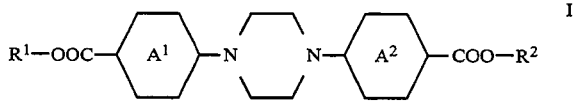

I wherein rings $A^1$ and $A^2$ each independently signify pyridine-2,5-diyl, pyrimidine-2,5-diyl or 1,4-phenylene, which is unsubstituted or substituted with at least one of halogen, cyano and/or methyl; $R^1$ and $R^2$ each independently represent alkyl with 1 to 18 carbon atoms in which optionally 1 —CH$_2$— group or 2 non-adjacent —CH$_2$— groups is/are replaced by —O—, —COO— and/or —OOC— and/or one —CH$_2$—CH$_2$— group can be replaced by —CH=CH—; with the proviso that at least one of the groups $R^1$ and $R^2$ must be chiral, liquid crystalline mixtures which contain these compounds and their use for optical and electro-optical purposes.

6 Claims, No Drawings

OPTICALLY ACTIVE PIPERAZINYL DERIVATIVES AS LIQUID CRYSTALS

FIELD OF THE INVENTION

The present invention is concerned with novel chiral dopants for liquid crystals and their manufacture, and with liquid crystalline mixtures which contain the dopants and their use for optical and electro-optical purposes.

BACKGROUND OF THE INVENTION

Liquid crystal materials for electro-optical indicators frequently contain one or more optically active additives for the induction of a chiral structure. For example, liquid crystal phases for indicators having a twisted nematic structure can be doped with optically active additives, e.g. in order to avoid a reversal of the direction of twisting (reverse twist) in TN cells (twisted-nematic) or in order to produce a sufficient twisting in cells having a highly twisted nematic structure, such as STN cells (super twisted-nematic), SBE cells (super birefringence effect) or OMI cells (optical mode interference). Further, cholesteric liquid crystals for phase-change cells can preferably consist of a nematic basic material and one or more optically active dopants and ferroelectric liquid crystals for indicators based on chiral tilted smectic phases can preferably consist of a material having a tilted smectic phase and one or more optically active dopants.

The electro-optical characteristics of liquid crystal indicators are temperature-dependent, which can be disadvantageous especially in the case of multiplex operation. It is, however, known that this temperature dependence can be compensated for at least partly by the addition of a chiral dopant which induces a lower pitch with increasing temperature. Such an inverse temperature dependence has hitherto been found only for a few compounds. It can, however, also be achieved by the use of at least 2 chiral dopants which have a different relative temperature dependence and induce a different twisting direction (U.S. Pat. No. 4,264,148). This usually requires a relatively high amount of chiral dopants.

Cholesteric liquid crystals reflect light essentially only in a wavelength range for which the wavelength is approximately equal to the helical pitch. The spectral width of this reflected light can be varied by a suitable choice of the liquid crystal. The reflected light is completely circularly polarized. The direction of rotation of the reflected light depends on the direction of rotation of the cholesteric helical structure. The light which is circularly polarized in the opposite direction is transmitted unimpaired. These properties can be utilized for the production of optical filters, polarizers, analyzers etc. Further, cholesteric liquid crystals are also variously used for thermochromic applications.

Cholesteric liquid crystals for the above applications can consist of a nematic or cholesteric basic material and one or more chiral dopants, which permits a simple adjustment of the desired helical pitch.

In order to produce cholesteric mixtures having a pitch in the range of the wavelength of visible light, the chiral dopant should have a twisting capacity which is as high as possible and should have good solubility in usual liquid crystal materials. Furthermore, the chiral dopants should have sufficient stability. They should have good compatibility with the mesophase type of liquid crystal material and should not severely restrict the mesophase range.

SUMMARY OF THE INVENTION

Dopants for the above purpose are now provided in accordance with the present invention. The invention pertains to optically active compounds of the formula

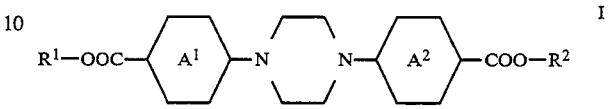

wherein rings $A^1$ and $A^2$ each independently signify pyridine-2,5-diyl, pyrimidine-2,5-diyl or 1,4-phenylene, which is unsubstituted or substituted with at least one of halogen, cyano and/or methyl; $R^1$ and $R^2$ each independently represent alkyl with 1 to 18 carbon atoms in which optionally 1 —$CH_2$— group or 2 non-adjacent —$CH_2$— groups is/are replaced by —O—, —COO— and/or —OOC— and/or one —$CH_2$—$CH_2$— group can be replaced by —CH=CH—; with the proviso that at least one of the groups $R^1$ and $R^2$ must be chiral.

DETAILED DESCRIPTION OF THE INVENTION

The invention is concerned with chiral compounds of the formula

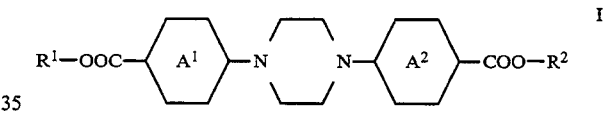

wherein rings $A^1$ and $A^2$ each independently are pyridine-2,5-diyl, pyrimidine-2,5-diyl or 1,4-phenylene, which is unsubstituted or substituted with at least one of halogen, cyano and methyl; $R^1$ and $R^2$ each independently represent alkyl with 1 to 18 carbon atoms in which optionally 1 —$CH_2$— group or 2 non-adjacent —$CH_2$— groups is/are replaced by —O—, —COO— and/or —OOC— and/or one —$CH_2$—$CH_2$— group can be replaced by —CH=CH—; with the proviso that at least one of the groups $R^1$ and $R^2$ must be chiral.

The compounds of formula I can be manufactured readily in a manner known per se. They have a relatively low viscosity and are stable towards electric and magnetic fields.

They have good solubility in usual liquid crystal materials and facilitate a high twisting of the liquid crystal structure. The clearing points of liquid crystals are not lowered or are lowered only insignificantly upon the addition of compounds of formula I.

The compounds of formula I can be used as dopants not only in nematic or cholesteric liquid crystals, but also in smectic liquid crystals.

The term "1,4-phenylene, which is unsubstituted or substituted with at least one of halogen, cyano and methyl", embraces in the scope of the invention, groups such as, for example, 1,4-phenylene, 2-fluoro-1,4-phenylene, 2,3-difluoro-1,4-phenylene, 2-chloro-1,4-phenylene, 2-bromo-1,4-phenylene, 2-cyano-1,4-phenylene, 2,3-dicyano-1,4-phenylene, 2-methyl-1,4-phenylene and the like. Preferred are 1,4-phenylene, 2-fluoro-1,4-phenylene and 2,3-difluoro-1,4-phenylene.

The term "halogen" means fluorine, chlorine, bromine or iodine. Preferred are fluorine and chlorine.

The term "alkyl with 1 to 18 carbon atoms in which optionally 1 —CH$_2$— group or 2 non-adjacent —CH$_2$— groups is/are replaced by —O—, —COO— and/or —OOC— and/or one —CH$_2$—CH$_2$— group can be replaced by —CH=CH—" means straight-chain or branched residues with 1 to 18, preferably 1 to 12 or 4 to 12, carbon atoms such as $C_1$-$C_{12}$ alkyl, $C_4$- $C_{12}$ 2-methylalkyl, $C_4$-$C_{12}$ 2-(3-alkenyl), $C_4$-$C_{12}$ 1-(alkoxycarbonyl)ethyl, $C_5$-$C_{12}$ 1-[(alkenyloxy)carbonyl]-ethyl and the like. Such residues are, for example, 2-butyl, 2-pentyl, 2-hexyl, 2-heptyl, 2-octyl, 2-nonyl, 2-decyl, 2-undecyl, 2-dodecyl, 2-methylbutyl, 2-methylpentyl, 2-methylhexyl, 2-methylheptyl, 2-methyloctyl, 2-methylnonyl, 2-methyldecyl, 2-methylundecyl, 2-methyldodecyl, 2-(3-butenyl), 2-(3E-pentenyl), 2-(3E-hexenyl), 2-(3E-heptenyl), 2-(3E-octenyl), 2-(3E-nonenyl), 2-(3E-decenyl), 2-(3E-undecenyl), 2-(3E-dodecenyl), 1-(methoxycarbonyl)ethyl, 1-(ethoxycarbonyl)ethyl, 1-(propyloxycarbonyl)ethyl, 1-(butoxycarbonyl)ethyl, 1-(pentyloxycarbonyl)ethyl, 1-(hexyloxycarbonyl)ethyl, 1-(heptyloxycarbonyl)ethyl, 1-(octyloxycarbonyl)ethyl, 1-(nonyloxycarbonyl)ethyl, 1-([trans-2-propenyloxy]carbonyl)ethyl, 1-([trans-2-butenyloxy]-carbonyl)ethyl, 1-([trans-2-pentenyloxy]carbonyl)ethyl, 1-([trans-2-hexenyloxy]carbonyl)-ethyl, 1-([trans-2-heptenyloxy]carbonyl)ethyl, 1-([trans-2-octenyloxy]carbonyl)ethyl, 1-([trans-2-nonenyloxy]carbonyl)ethyl and the like.

Compounds of formula I in which rings $A^1$ and $A^2$ are both the same and in which residues $R^1$ and $R^2$ are both the same, are preferred. Compounds of formula I in which rings $A^1$ and $A^2$ are pyridine-2,5-diyl or 1,4-phenylene, which is unsubstituted or substituted with at least one of halogen, cyano and/or methyl, are preferred.

Further preferred compounds of formula I are compounds in which the chiral alkyl groups have 4 to 12, especially 4 to 8, carbon atoms and in which both chiral alkyl groups have either the R-configuration or both chiral alkyl groups have the S-configuration. Preferably, the center of chirality is situated as close as possible to the central part of the ring, whereby an especially high twisting capacity is achieved.

Compounds of formula I in which rings $A^1$ and $A^2$ are each pyridine-2,5-diyl are particularly preferred. These compounds are characterized by good solubility and high polarizability, whereby the compounds—in addition to their use as dopants in nematic mixtures—are also excellently suited for use in ferroelectric liquid crystals.

Other preferred compounds of formula I are compounds in which rings $A^1$ and $A^2$ are each a 1,4-phenylene group, which is unsubstituted or substituted with at least one of halogen, cyano and/or methyl.

The compounds of formula I are very readily synthesized. The compounds of formula I in which rings $A^1$ and $A^2$ are each 1,4-phenylene can be manufactured, e.g., by converting the commercially available 1,4-piperazinediyl-diphenyl in a manner known per se via bis-4,4'-(1,4-piperazinediyl)dibenzaldehyde into a derivative suitable for esterification with ROH (J. Med. Chem. 10,111 [1967]). The compounds of formula I in which rings $A^1$ and $A^2$ are each pyridine-2,5-diyl can be manufactured by coupling the corresponding 6-chloronicotinic acid ester with piperazine in a suitable solvent.

The manufacturing methods are illustrated in more detail by the Examples.

The invention is also concerned with liquid crystalline mixtures containing a liquid crystalline carrier material and one or more optically active compounds of formula I. Suitable carrier materials are basically all liquid crystal materials which have a twistable liquid crystal phase with an adequate mesophase range. The compounds of formula I are especially suitable as chiral dopants for nematic or cholesteric carrier materials. The liquid crystalline carrier material can be a single compound or a mixture, and preferably has a clearing point of at least about 60° C., particularly at least about 80° C.

The amount of chiral dopant of formula I is determined essentially by its twisting capacity and the desired pitch. The amount of chiral dopant can therefore vary in a wide range according to application and can be, for example, about 0.1–30 wt. %. Depending on cell type and thickness, a pitch of about 30–40 μm is mainly required for indicators based on liquid crystals having a twisted nematic structure and therefore a correspondingly lower amount is sufficient. On the other hand, for applications which are based on the reflection of visible light by cholesteric layers, pitches of about 0.4–0.6 μm are required, which necessitates a correspondingly higher amount of chiral dopant.

Suitable liquid crystalline carrier materials are known and are commercially available in large numbers. As a general rule, liquid crystalline mixtures containing 2 or more components as carrier materials are preferred. Basically, however, a single liquid crystalline compound can also be used as the carrier material when it has a sufficiently broad mesophase.

Compounds of the following formulas are suitable as components for liquid crystalline carrier materials

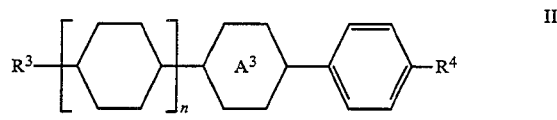

II

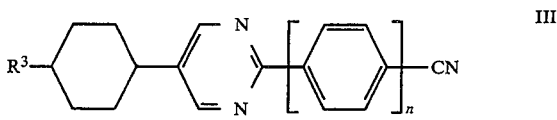

III

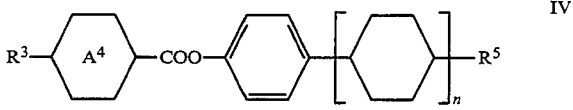

IV

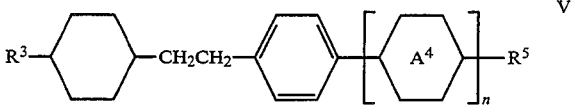

V

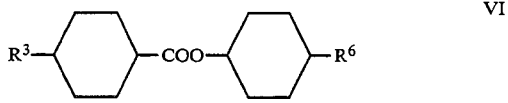

VI

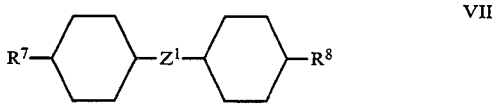

VII

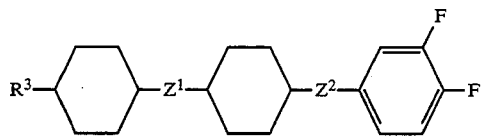

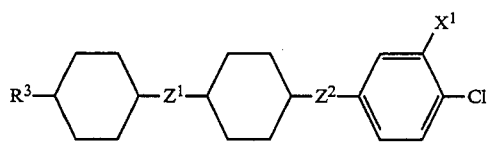

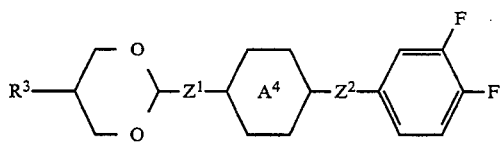

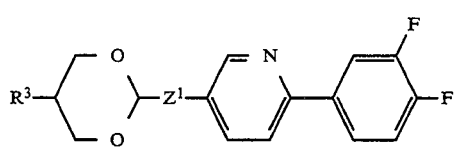

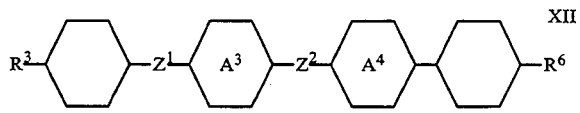

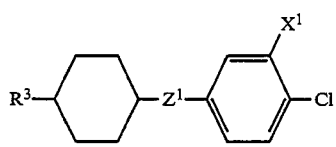

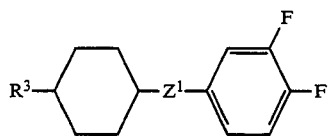

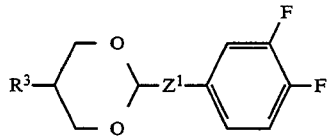

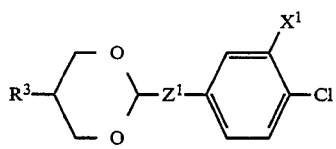

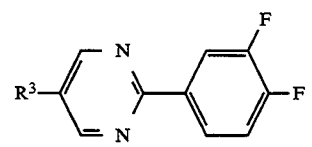

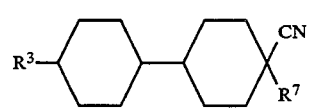

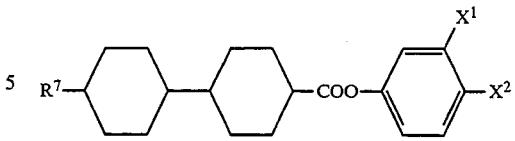

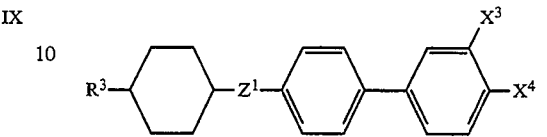

wherein ring $A^3$ is 1,4-phenylene, pyridine-2,5-diyl, pyrimidine-2,5-diyl, trans-1,4-cyclohexylene or trans-1,3-dioxane-2,5-diyl; ring $A^4$ represents 1,4-phenylene or trans-1,4-cyclohexylene; n is the number 0 or 1; $Z^1$ and $Z^2$ each independently denote a single bond or $-CH_2CH_2-$, whereby two aromatic rings are always linked by a single bond; $R^3$ and $R^6$ each independently denote alkyl, alkoxyalkyl, 3E-alkenyl and, on saturated rings, $R^3$ and $R^6$ are also 1E-alkenyl; $R^4$ signifies alkyl, 3E-alkenyl, 4-alkenyl, alkoxy, 2E-alkenyloxy, 3-alkenyloxy, 1-alkynyl, cyano, isothiocyanato or fluorine; $R^5$ denotes alkyl, 3E-alkenyl, 4-alkenyl or, on trans-1,4-cyclohexylene, R5 is 1E-alkenyl or, on 1,4-phenylene, $R^5$ is cyano, isothiocyanato, alkoxy, 2E-alkenyl or 3-alkenyloxy; $R^7$ is alkyl, 1E-alkenyl, 3E-alkenyl or 4-alkenyl; $R^8$ represents cyano, alkyl, 1E-alkenyl, 3E-alkenyl, 4-alkenyl, alkoxy, 2E-alkenyloxy, 3-alkenyloxy, alkoxymethyl or (2E-alkenyl)oxymethyl; $X^1$ is hydrogen, fluorine or chlorine; $X^2$ denotes cyano, fluorine or chlorine; $X^3$ is hydrogen or fluorine; and $X^4$ stands for chlorine or fluorine.

$R^3$, $R^4$, $R^5$, $R^6$, $R^7$ and $R^8$ preferably have 1 to 12 carbon atoms, preferably 1 to 7 carbon atoms.

The aforementioned term "aromatic ring" means 1,4-phenylene, pyridine-2,5-diyl or pyrimidine-2,5-diyl. The aforementioned term "saturated ring" signifies trans-1,4-cyclo-hexylene or trans-1,4-dioxane-2,5-diyl.

The invention is illustrated by the following Examples. In connection with liquid crystal phases and phase transitions C signifies a crystalline phase, N signifies a nematic phase, N* signifies a cholesteric phase, S signifies a smectic phase and I signifies the isotropic phase. The helical pitch is denoted by p. Optical antipodes have in each case "mirror image properties", i.e. the same melting point etc., but lead to opposite helical rotation and opposite circular polarization of reflected light. Unless, otherwise indicated, the Examples were carried out as written.

EXAMPLE 1

A mixture of 1.4 g of (S)-1-(ethoxycarbonyl)ethyl 6-chloronicotinate, 0.2 g of piperazine and 25 ml of ethanol was heated at 80° C. for 2 days. The reaction mixture was treated with 500 ml of water and then extracted three times with 100 ml of diethyl ether each time. The combined organic phases were washed twice with 500 ml of concentrated sodium chloride solution each time, dried over magnesium sulphate, filtered and subsequently concentrated. The residue was chromatographed on silica gel with toluene/ethyl acetate (vol. 4:1). Recrystallization from ethanol gave pure bis-[(S)-1-(ethoxycarbonyl)ethyl] 6,6'-(1,4-piperazinediyl)-dinicotinate with m.p. (C-I) 143° C., $[\alpha]^{20}_{589} = +68.3°$.

The (S)-1-(ethoxycarbonyl)ethyl 6-chloronicotinate used as the starting material was prepared as follows:

a) 1.5 g of 6-chloronicotinic acid were heated to 80° C. for 24 hours with 25 ml of thionyl chloride in toluene. The solution obtained was evaporated under reduced pressure, the residue was treated with 20 ml of absolute toluene and the solution was again evaporated under reduced pressure. The solid residue was sublimed in a bulb tube. This gave 14.84 g of 6-chloronicotinoyl chloride with m.p. 48° C.

b) 2.5 g of 6-chloronicotinoyl chloride were taken up in 50 ml of absolute toluene and treated with a solution of 1.7 g of ethyl L(−)-lactate in 5 ml of absolute pyridine. The reaction mixture was heated to reflux for 1 hour, then cooled, treated with dilute hydrochloric acid and extracted three times with 50 ml of dichloromethane each time. The combined organic phases were washed twice with 100 ml of water each time, dried over mag-nesium sulphate and concentrated. The crude product obtained was purified by column chromatography on silica gel with toluene/ethyl acetate (vol. 4:1). This gave 2.6 g of pure (97%) (S)-1-(ethoxycarbonyl)ethyl 6-chloronicotinate with $[\alpha]^{20}_{589}= +14.4°$.

The following compounds can be manufactured in an analogous manner:

Bis-[(S)-1-(methoxycarbonyl)ethyl] 6,6'-(1,4-piperazinediyl)dinicotinate, m.p. 169° C., $[\alpha]^{20}_{589}= +70.9°$;

bis-[(S)-1-(propyloxycarbonyl)ethyl] 6,6'-(1,4-piperazinediyl)dinicotinate, m.p. 160° C.;

bis-[(S)-1-(butoxycarbonyl)ethyl] 6,6'-(1,4-piperazinediyl)dinicotinate, m.p. 125° C., $[\alpha]^{20}_{589}= +61.6°$;

bis [(S)-1-([trans-2-butenyloxy]carbonyl)ethyl 6,6'-(1,4-piperazinediyl)dinicotinate;

bis [(S)-1-([trans-2-hexenyloxy]carbonyl)ethyl 6,6'-(1,4-piperazinediyl)dinicotinate;

bis [(S)-1-([trans-2-butenyloxy]carboxyyl)ethyl 6,6'-(1,4-piperazinediyl)dinicotinate;

bis-[(S)-2-pentyl] 6,6'-(1,4-piperazinediyl)dinicotinate, m.p. 119° C., $[\alpha]^{20}_{589}= +49.8°$;

bis-[(S)-2-hexyl] 6,6'-(1,4-piperazinediyl)dinicotinate;

bis-[(S)-2-heptyl] 6,6'-(1,4-piperazinediyl)dinicotinate;

bis-[(S)-2-octyl] 6,6'-(1,4-piperazinediyl)dinicotinate, m.p. 94° C., $[\alpha]^{20}_{589}= +65°$;

bis-[(S)-2-nonyl] 6,6'-(1,4-piperazinediyl)dinicotinate;

bis-[(R)-1-(methoxycarbonyl)ethyl] 6,6'-(1,4-piperazinediyl)dinicotinate, m.p. 169° C., $[\alpha]^{20}_{589}= +70.9°$;

bis-[(R)-1-(propyloxycarbonyl)ethyl] 6,6'-(1,4-piperazinediyl)dinicotinate, m.p. 160° C.;

bis-[(R)-1-(butoxycarbonyl)ethyl] 6,6'-(1,4-piperazinediyl)dinicotinate, m.p. 125° C., $[\alpha]^{20}_{589}= -61.6°$;

bis [(R)-1-([trans-2-butenyloxy]carbonyl)ethyl 6,6'-(1,4-piperazinediyl)dinicotinate;

bis [(R)-1-([trans-2-pentenyloxy]carbonyl)ethyl 6,6'-(1,4-piperazinediyl)dinicotinate;

bis [(R)-1-([trans-2-hexenyloxy]carbonyl)ethyl 6,6'-(1,4-piperazinediyl)dinicotinate;

bis-[(R)-2-pentyl] 6,6'-(1,4-piperazinediyl)dinicotinate, m.p. 119° C., $[\alpha]^{20}_{589}= -49.8°$;

bis-[(R)-2-hexyl] 6,6'-(1,4-piperazinediyl)dinicotinate;

bis-[(R)-2-heptyl] 6,6'-(1,4-piperazinediyl)dinicotinate:

bis-[(R)-2-octyl] 6,6'-(1,4-piperazinediyl)dinicotinate, m.p. 94° C., $[\alpha]^{20}_{589}= -65°$;

bis-[(R)-2-nonyl] 6,6'-(1,4-piperazinediyl)dinicotinate.

EXAMPLE 2

Bis-4,4'-(1,4-piperazinediyl)benzoyl chloride (1.1 g), 0.5 g of ethyl L(−)-lactate and 25 ml of toluene is reacted in an analogous manner to Example 1b). This gives bis-[(S)-1-ethoxycarbonyl)ethyl]4,4'-(1,4-piperazinediyl)dibenzoate.

The bis-4,4'-(1,4-piperazinediyl)benzoyl chloride used as the starting material may be prepared as follows:

a) A solution of 2 g of bis-4,4'-(1,4-piperazinediyl)dibenzaidehyde in 100 ml of acetone is treated dropwise with 100 ml of Jones' reagent. The mixture is stirred at room temperature for 1 hour and then poured into 100 ml of water. The precipitate which thereby results is filtered off, washed portionwise with water and dried in a vacuum. The crude product is recrystallized from ethanol and yields pure bis-4,4'-(1,4-piperazinediyl)dibenzoic acid.

b) 1.2 g of bis-4,4'-(1,4-piperazinediyl)dibenzoic acid, 10 ml of thionyl chloride and 100 ml of toluene are reacted in an analogous manner to Example 1a). This gives bis-4,4'-(1,4-piperazinediyl)benzoyl chloride.

The following compounds may be manufactured in an analogous manner:

Bis-[(S)-1-(methoxycarbonyl)ethyl] 4,4'-(1,4-piperazinediyl)dibenzoate;

bis[(S)-1-(propyloxycarbonyl)ethyl] 4,4'-(1,4-piperazinediyl)dibenzoate;

bis[(S)-1-(butoxycarbonyl)ethyl] 4,4'-(1,4-piperazinediyl)dibenzoate;

bis[(S)-2-pentyl] 4,4'-(1,4-piperazinediyl)dibenzoate;
bis[(S)-2-hexyl] 4,4'-(1,4-piperazinediyl)dibenzoate;
bis[(S)-2-heptyl] 4,4'-(1,4-piperazinediyl)dibenzoate;
bis[(S)-2-octyl] 4,4'-(1,4-piperazinediyl)dibenzoate;
bis[(S)-2-nonyl] 4,4'-(1,4-piperazinediyl)dibenzoate.

EXAMPLE 3

The following nematic liquid crystal basic mixture BM-1 was used to measure the induced pitch and its temperature dependence in liquid crystal materials.

5.36 wt. % of 4'-ethyl-4-cyanobiphenyl, 3.18 wt. % of 4'-propyl-4-cyanobiphenyl, 6.08 wt. % of 4'-butyl-4-cyanobiphenyl, 6.53 wt. % of 4-(trans-4-propylcyclohexyl)benzonitrile, 14.67 wt. % of 4-(trans-4-pentylcyclohexyl)benzonitrile, 5.21 wt. % of 4-ethyl-1-(trans-4-propylcyclohexyl)benzene, 16.54 wt. % of 4-ethoxy-1-[2-(trans-4-propylcyclohexyl)ethyl]benzene, 5.60 wt. % of 4''-pentyl-4-cyano-p-terphenyl, 5.71 wt. % of 4'-(trans-4-pentylcyclohexyl)-4-cyanobiphenyl, 15.95 wt. % of 1-[2-(trans-4-butylcyclohexyl)ethyl]-4-(trans-4-pentylcyclohexyl)benzene, 4.74 wt. % of 4-[2-(trans-4-butylcyclohexyl)ethyl]-4'-(trans-4-pentylcyclohexyl)biphenyl, 7.59 wt. % of 4-[2-(trans-4-butylcyclohexyl)ethyl]-4'-(trans-4-pentylcyclohexyl)-1,1'-ethylenedibenzene, 2.84 wt. % of trans-4-[2-trans-4-propylcyclohexyl)ethyl]cyclohexanecarboxylic acid 4-cyanophenyl ester;

m.p.<−30° C.; cl.p. (N-I) 90° C.; $\Delta\epsilon=8.5$; $\Delta n=0.139$ and $\eta=22$ mPa·s measured at 22° C.

Liquid crystal basic mixture BM-1 was treated with each of the following optically active dopants:

D-1=bis-[(R)-2-octyl] 6,6'-(1,4-piperazinediyl)dinicotinate.

D-2 = bis-[(S)-1-(ethoxycarbonyl)ethyl] 6,6′-(1,4-piperazinediyl)dinicotinate.

The results obtained for the chiral doped mixtures have been compiled in Table 1 in which A, B and C denote the parameters of the equation $$\frac{1}{pc} = A + BT_1 + CT_1^2$$

and p, c and $T_1$ have the following significances:
$T_1 = T - 22°$ C.;
T = temperature in °C.;
P = pitch in μm (a positive value signifies dextrorotatory helical structure and a negative value signifies a levorotatory helical structure);
c = concentration of the optically active dopant in wt.%.

Ps $(T_{sc}* - 15°)$ = spontaneous polarizability measured below the phase transition temperature.
τ = switching velocity.

I claim:

1. An optically active compound of the formula:

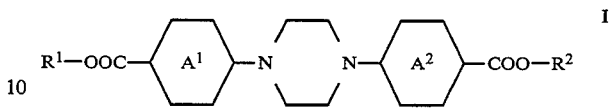

wherein rings $A^1$ and $A^2$ are the same and are pyridine-2,5-diyl, pyrimidine-2,5-diyl or 1,4-phenylene, which is unsubstituted or substituted with at least one of halogen, cyano and methyl; $R^1$ and $R^2$ are the same and are branched alkyl with 1 to 18 carbon atoms in which a —$CH_2$— group or two non-adjacent —$CH_2$— groups

TABLE 1

| Mixture | Dopant | A<br>$[10^{-2} \cdot \mu m^{-1} \cdot wt. \%^{-1}]$ | B<br>$[10^{-4} \cdot \mu m^{-1} \cdot wt. \%^{-1} \cdot °C.^{-1}]$ | C<br>$[10^{-6} \cdot \mu m^{-1} \cdot wt. \%^{-1} \cdot °C.^{-2}]$ | p · c (at 22° C.)<br>[μm · wt. %] |
|---|---|---|---|---|---|
| M-1 | 7 wt. % of D-1 | 18.43 | −3.94 | −5.55 | +5.4 |
| M-2 | 7 wt. % of D-2 | −21.20 | 5.52 | −2.44 | −4.7 |

EXAMPLE 4

The following liquid crystal basic mixture BM-2 was used to measure the spontaneous polarizability (Ps) of ferroelectric smectic liquid crystal materials.

4.6 wt. % of 2-(4-octyloxyphenyl)-5-heptylpyrimidine
15.7 wt. % of 2-(4-nonyloxyphenyl)-5-nonylpyrimidine
15.7 wt. % of 2-(4-hexyloxyphenyl)-5-nonylpyrimidine
13.6 wt. % of 2-(4-decyloxyphenyl)-5-decylpyrimidine
25.1 wt. % of 4-decyloxybenzoic acid 4-[2-(trans-4-pentylcyclohexyl)ethyl]phenyl ester
12.6 wt. % of 4-undecyloxybenzoic acid 4-[2-(trans-4-pentylcyclohexyl)ethyl]phenyl ester
12.6 wt. % of 4-dodecyloxybenzoic acid 4-[2-(trans-4-pentylcyclohexyl)ethyl]phenyl ester.

The liquid crystal basic mixture BM-2 was treated with an optically active dopant:

D-3 = bis-[(S)-2-octyl] 6,6′-(1,4-piperazinediyl)dinicotinate
93 wt. % of BM-2
7 wt. % of D-3
ΔT $(S_c*)$ −4° C., Ps $(T_{sc}* -15°)$=88 nC/cm$^2$, τ550 μsec.
ΔT $(S_c*)$ = lowering of the phase transition temperature $S_c*$ to $S_A$, N or I.

can be replaced by —O—, —COO— and/or —OOC— and/or one —$CH_2$—$CH_2$— group can be replaced by —CH=CH—.

2. The optically active compound according to claim 1, wherein rings $A^1$ and $A^2$ both represent pyridine-2,5-diyl or 1,4-phenylene, both of which is unsubstituted or substituted with at least one of halogen, cyano or methyl.

3. The optically active compound according to claim 1, wherein $R^1$ and $R^2$ are branched alkyl groups with 4 to 12 carbon atoms in which one —$CH_2$— group or two non-adjacent —$CH_2$— groups can be replaced by —O—, —COO— and/or —OOC— and/or one —$CH_2$—$CH_2$— can be replaced by —CH=CH—.

4. The optically active compound according to claim 1, wherein $R^1$ and $R^2$ each are selected from the group consisting of $C_1$–$C_{12}$ alkyl, $C_4$–$C_{12}$ 2-methylalkyl, $C_4$–$C_{12}$ 2-(3-alkenyl), $C_4$–$C_{12}$ 1-(alkoxycarbonyl)ethyl or $C_5$–$C_{12}$ 1-[(alkenyloxy)-carbonyl]ethyl.

5. The optically active compound according to claim 1, wherein rings $A^1$ and $A^2$ each are pyridine-2,5-diyl; and $R^1$ and $R^2$ each are 2-alkyl,1-(alkoxycarbonyl)ethyl or 1-[(2-alkenyloxy)carbonyl]ethyl with 4 to 8 carbon atoms.

6. A liquid crystalline mixture containing a liquid crystalline carrier material and at least one optically active compound according to claim 1.

* * * * *